United States Patent
Stoia et al.

(10) Patent No.: US 9,470,421 B2
(45) Date of Patent: Oct. 18, 2016

(54) COMBUSTOR CAP ASSEMBLY

(71) Applicant: General Electric Company, Schenectady, NY (US)

(72) Inventors: Lucas John Stoia, Taylors, SC (US); Patrick Benedict Melton, Horse Shoe, NC (US); Carolyn Ashley Antoniono, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 288 days.

(21) Appl. No.: 14/462,646

(22) Filed: Aug. 19, 2014

(65) Prior Publication Data

US 2016/0054004 A1    Feb. 25, 2016

(51) Int. Cl.
| F23R 3/28 | (2006.01) |
| F23R 3/00 | (2006.01) |
| F23R 3/04 | (2006.01) |
| F02C 7/18 | (2006.01) |
| F23R 3/10 | (2006.01) |
| F23R 3/60 | (2006.01) |

(52) U.S. Cl.
CPC .............. *F23R 3/283* (2013.01); *F02C 7/18* (2013.01); *F23R 3/002* (2013.01); *F23R 3/04* (2013.01); *F23R 3/10* (2013.01); *F05B 2260/201* (2013.01); *F23R 3/60* (2013.01); *F23R 2900/03041* (2013.01); *F23R 2900/03044* (2013.01)

(58) Field of Classification Search
CPC ............ F23R 3/002; F23R 3/04; F23R 3/10; F23R 3/283; F23R 3/60; F23R 2900/03041; F23R 2900/03044; F02C 7/18; F05B 2260/201
See application file for complete search history.

(56) References Cited

U.S. PATENT DOCUMENTS

| 5,274,991 | A  | * | 1/1994  | Fitts ........................ F23R 3/283 60/39.37 |
| 5,357,745 | A  |   | 10/1994 | Probert |
| 6,484,505 | B1 | * | 11/2002 | Brown .................... F23R 3/002 60/760 |
| 6,923,002 | B2 |   | 8/2005  | Crawley et al. |
| 8,387,396 | B2 | * | 3/2013  | Chen ....................... F01D 9/023 60/752 |
| 2009/0188255 | A1 | * | 7/2009  | Green ..................... F01D 9/023 60/737 |
| 2010/0300106 | A1 |   | 12/2010 | Edwards et al. |
| 2011/0197586 | A1 | * | 8/2011  | Berry ....................... F23R 3/02 60/722 |
| 2012/0055163 | A1 | * | 3/2012  | Uhm ....................... F01D 9/023 60/742 |

(Continued)

OTHER PUBLICATIONS

Co pending U.S. Appl. No. 14/462,637, filed Aug. 19, 2014.
Co pending U.S. Appl. No. 14/462,639, filed Aug. 19, 2014.

*Primary Examiner* — Gerald L Sung
*Assistant Examiner* — Scott Walthour
(74) *Attorney, Agent, or Firm* — Dority & Manning, PA

(57) ABSTRACT

A combustor cap assembly includes an annular shroud and an impingement plate coupled to the shroud. The impingement plate at least partially defines a plurality of impingement cooling holes and a cooling flow return passage. A cap plate is coupled to the impingement plate. The cap plate includes an impingement side which faces a second side portion of the impingement plate where the impingement side is axially spaced from the second side portion to define an impingement air plenum therebetween. The cooling flow return passage is in fluid communication with the impingement air plenum. A fluid conduit extends from a first side portion of the impingement plate towards a first end portion of the shroud. The fluid conduit is in fluid communication with the cooling flow return passage and provides for fluid communication out of the impingement air plenum.

20 Claims, 6 Drawing Sheets

(56) References Cited

U.S. PATENT DOCUMENTS

| | | | |
|---|---|---|---|
| 2012/0060511 A1* | 3/2012 | Zuo | F01D 25/12 60/806 |
| 2013/0074503 A1* | 3/2013 | Rohrssen | F23R 3/10 60/740 |
| 2013/0086912 A1* | 4/2013 | Berry | F23R 3/283 60/746 |

* cited by examiner

COMBUSTOR CAP ASSEMBLY

FIELD OF THE INVENTION

The present invention generally relates to a combustor for a gas turbine. More particularly, this invention involves a system for cooling a cap plate of a combustor cap assembly disposed within the combustor.

BACKGROUND OF THE INVENTION

In an air-ingesting turbomachine (e.g., a gas turbine), air enters a compressor and is progressively pressurized as it is routed towards a combustor. The compressed air is premixed with a fuel and ignited within a combustion chamber defined within the combustor, thus producing high temperature combustion gases. The combustion gases are then routed from the combustion chamber via a liner and/or a transition piece into a turbine section of the turbomachine where the combustion gases flow across alternating rows of stationary vanes and rotor blades which are secured to a rotor shaft. As the combustion gases flow across the rotor blades, kinetic and/or thermal energy are transferred to the rotor blades, thus causing the rotor shaft to rotate.

To increase turbine efficiency, modern combustors are operated at high temperatures which generate high thermal stresses on various mechanical components disposed within the combustor. As a result, at least a portion of the compressed air supplied to the combustor is used to cool these components. For example, particular combustors include a generally annular cap assembly that at least partially surrounds one or more fuel nozzles within the combustor. Certain cap assembly designs include a cap plate that is disposed at a downstream end of the cap assembly. The fuel nozzles extend at least partially through the cap plate which is typically disposed substantially adjacent to the combustion chamber. As a result, the cap plate is generally exposed to extremely high temperatures.

One way to cool the cap plate is to route a portion of the compressed air into the cap assembly and onto an upstream side of the cap plate. The compressed air is then routed through multiple cooling holes which extend through the cap plate. This method is known in the industry as effusion cooling. However, the compressed air flowing through the multiple cooling holes enters the combustion chamber generally unmixed with the fuel. As a result, NOx and/or $CO_2$ generation may be exacerbated and overall turbine efficiency may be decreased. Therefore, an improved system for cooling the cap plate would be useful.

BRIEF DESCRIPTION OF THE INVENTION

Aspects and advantages of the invention are set forth below in the following description, or may be obvious from the description, or may be learned through practice of the invention.

One embodiment of the present invention is a combustor cap assembly. The combustor cap assembly includes an annular shroud having a first end portion and a second end portion. An impingement plate is coupled to the shroud proximate to the second end portion. The impingement plate includes a first side portion, a second side portion and an outer band portion. The impingement plate at least partially defines a plurality of impingement cooling holes and a cooling flow return passage. A cap plate is coupled to the impingement plate and includes an impingement side which faces the second side portion of the impingement plate. The impingement side is axially spaced from the second side portion to define an impingement air plenum therebetween. The cooling flow return passage is in fluid communication with the impingement air plenum. The combustor cap assembly further includes a fluid conduit that is in fluid communication with the cooling flow return passage. The fluid conduit extends from the first side portion of the impingement plate towards the first end portion of the shroud.

Another embodiment of the present invention is a combustor. The combustor includes a fuel nozzle which extends axially within an outer casing, and a combustor cap assembly having an annular shroud which circumferentially surrounds at least a portion of the fuel nozzle. The shroud at least partially defines an annular flow passage within the outer casing. The combustor cap assembly further comprises an impingement plate that is coupled to a second end portion of the shroud. The impingement plate includes a first side portion, a second side portion and an outer band portion. The impingement plate at least partially defines a plurality of impingement cooling holes and a cooling flow return passage. The shroud and the first side portion of the impingement plate at least partially define a cooling air plenum which in fluid communication with the annular flow passage. A cap plate is coupled to the impingement plate and includes an impingement side which faces the second side portion of the impingement plate. The impingement side is axially spaced from the second side portion to define an impingement air plenum therebetween. The plurality of impingement cooling holes provide for fluid communication between the cooling air plenum and the impingement air plenum. The cooling flow return passage provides for fluid flow out of the impingement air plenum. A fluid conduit is in fluid communication with the cooling flow return passage. The fluid conduit extends within the cooling air plenum and is in fluid communication with the annular flow passage.

Another embodiment of the present invention is a gas turbine. The gas turbine includes a compressor section, a combustion section that is downstream from the compressor section and a turbine which is disposed downstream from the combustion section. The combustion section includes a combustor that is at least partially surrounded by an outer casing. The combustor includes a fuel nozzle which extends axially within the outer casing and a combustor cap assembly which circumferentially surrounds at least a portion of the fuel nozzle. The combustor cap assembly includes an annular shroud having a first end portion and a second end portion. The shroud at least partially defines an annular flow passage within the outer casing. An impingement plate is coupled to the shroud proximate to the second end portion. The impingement plate has a first side portion which is axially spaced from a second side portion. The impingement plate defines a plurality of impingement cooling holes and a cooling flow return passage. A cooling air plenum is at least partially defined by the shroud and the first side portion of the impingement plate. A cap plate is coupled to the impingement plate and an impingement plenum is defined between the second side portion of the impingement plate and an impingement side of the cap plate. The plurality of impingement cooling holes provide for fluid flow into the impingement plenum and the cooling flow return passage provides for fluid flow out of the impingement plenum. The combustor cap assembly further includes a fluid conduit which is in fluid communication with the cooling flow return passage. The fluid conduit defines a cooling flow exhaust passage within the cooling air plenum which is fluidly isolated from the cooling air plenum.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
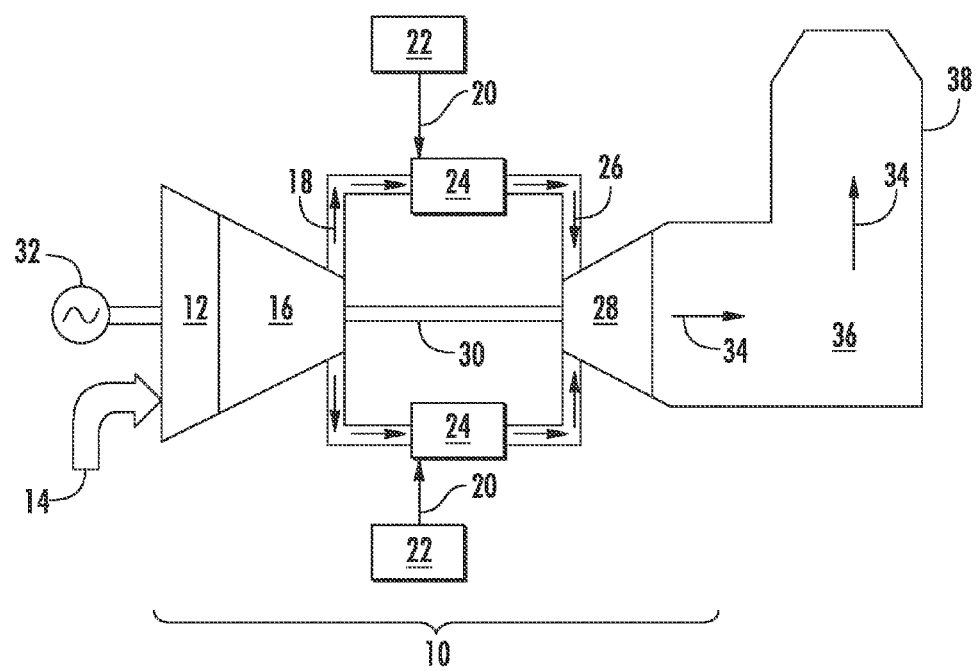
FIG. 1 illustrates a functional diagram of an exemplary gas turbine as may incorporate at least one embodiment of the present invention.

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel and/or coaxially aligned to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents.

Although an industrial or land based gas turbine is shown and described herein, the present invention as shown and described herein is not limited to a land based and/or industrial gas turbine unless otherwise specified in the claims. For example, the invention as described herein may be used in an aircraft gas turbine or marine gas turbine.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed or pressurized air 18.

The compressed air 18 is mixed with a fuel 20 from a fuel source 22 such as a fuel skid to form a combustible mixture within one or more combustors 24. The combustible mixture is burned to produce combustion gases 26 having a high temperature, pressure and velocity. The combustion gases 26 flow through a turbine 28 of a turbine section to produce work. For example, the turbine 28 may be connected to a shaft 30 so that rotation of the turbine 28 drives the compressor 16 to produce the compressed air 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
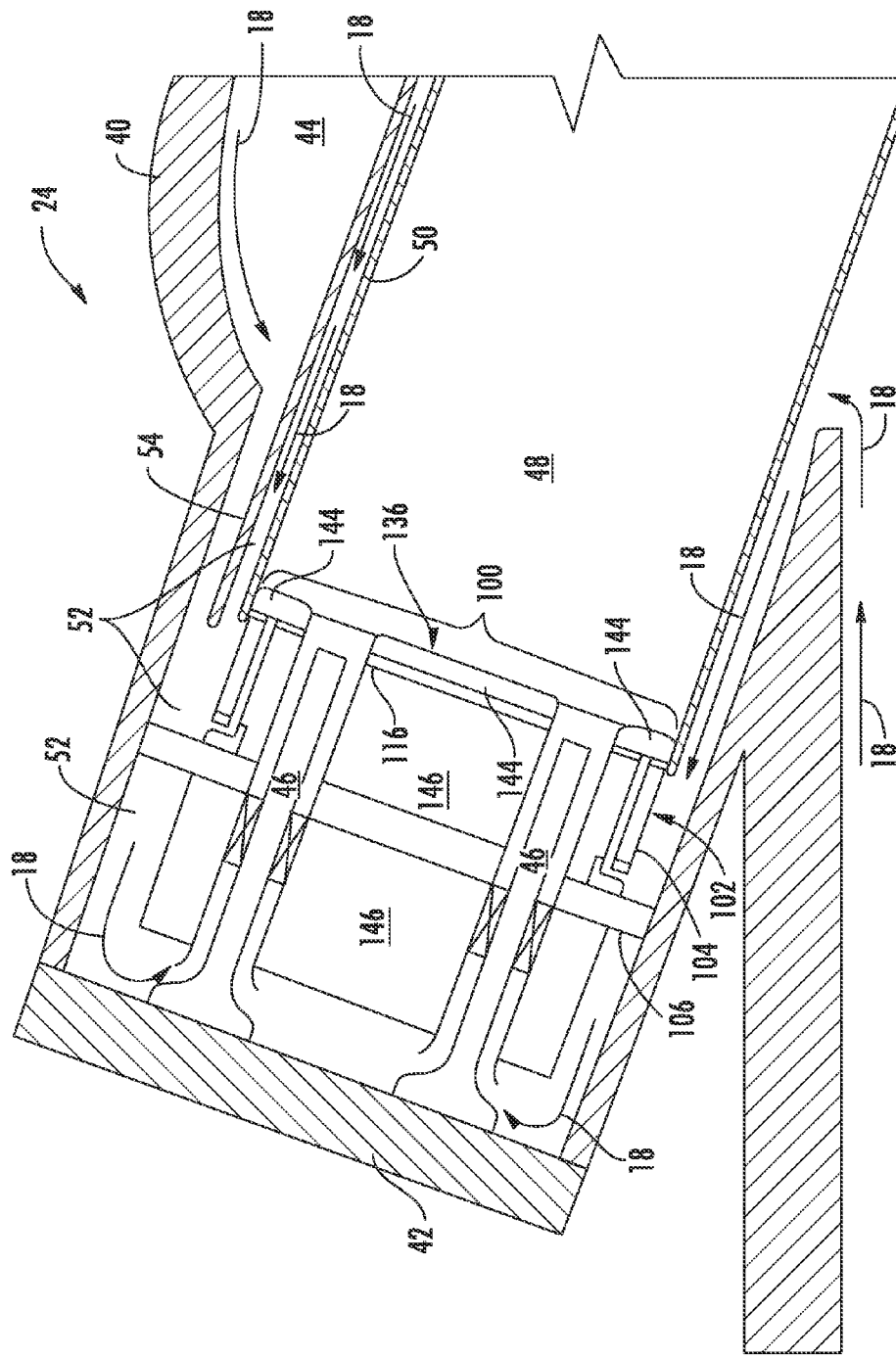
FIG. 2 is a cross sectional side view of a portion of an exemplary combustion section of a gas turbine including an exemplary combustor, according to one or more embodiments of the present invention.

FIG. 2 is a cross sectional side view of a portion of an exemplary combustor 24 according to one or more embodiments of the present invention. As shown in FIG. 2, the combustor 24 is at least partially surrounded by at least one outer casing 40 such as a compressor discharge casing. The outer casing 40 is in fluid communication with the compressor 16 (FIG. 1) so as to receive at least a portion of the compressed air 18 therefrom. In one configuration, as shown in FIG. 2, an end cover 42 is coupled to the outer casing 40 to provide a seal around an opening defined within the outer casing 40. The opening is generally sized for receiving the combustor 24. The outer casing 40 and the end cover 42 at least partially define a high pressure plenum 44 which at least partially surrounds the combustor 24.

At least one fuel nozzle 46 extends axially within the outer casing 40 with respect to an axial centerline of the combustor 24. As shown in FIG. 2, the combustor 24 may include a plurality of fuel nozzles 46 extending axially within the outer casing 40. The fuel nozzle 46 may be coupled at a first end to the end cover 42. A second or downstream end of the fuel nozzle 46 terminates proximate to a combustion chamber or zone 48 defined within the outer casing 40.

A combustion liner 50 extends downstream from the fuel nozzle 46 and may at least partially define the combustion chamber 48. In addition, the combustion liner 50 may at least partially define an annular flow passage 52 within the outer casing 40. In particular embodiments, the annular flow passage 52 may be further defined by one or more of an impingement sleeve or liner 54 which surrounds the combustion liner 50. In particular embodiments, the annular flow passage 52 may be further defined by the outer casing 40, the end cover 42 and/or other liner or features defined within the outer casing 40.

At least a portion of the fuel nozzle 46 extends axially through a combustor cap assembly 100. The combustor cap assembly 100 extends radially, circumferentially and axially within the outer casing 40. The combustor cap assembly 100 includes at least one annularly shaped shroud 102 which circumferentially surrounds at least a portion of the fuel nozzle 46. The shroud 102 may comprise a single or unitary shroud or may include multiple shrouds coupled together at or proximate to their respective ends via bolts, welding or any other suitable mechanical fastening means. In one embodiment, the shroud 102 comprises a first annular shroud 104 which is coupled to a second annular shroud 106.

In particular embodiments, the shroud 102 at least partially defines the annular flow passage 52 within the outer casing 40. In one embodiment, an outer side or surface of the outer shroud 102 at least partially defines the annular flow passage 52 within the outer casing 40. The annular flow passage 52 defines a fluid flow path for routing at least a portion of the compressed air 18 from the high pressure plenum 44 and/or the compressor 16 (FIG. 1) towards the end cover 42.

Figure 3:
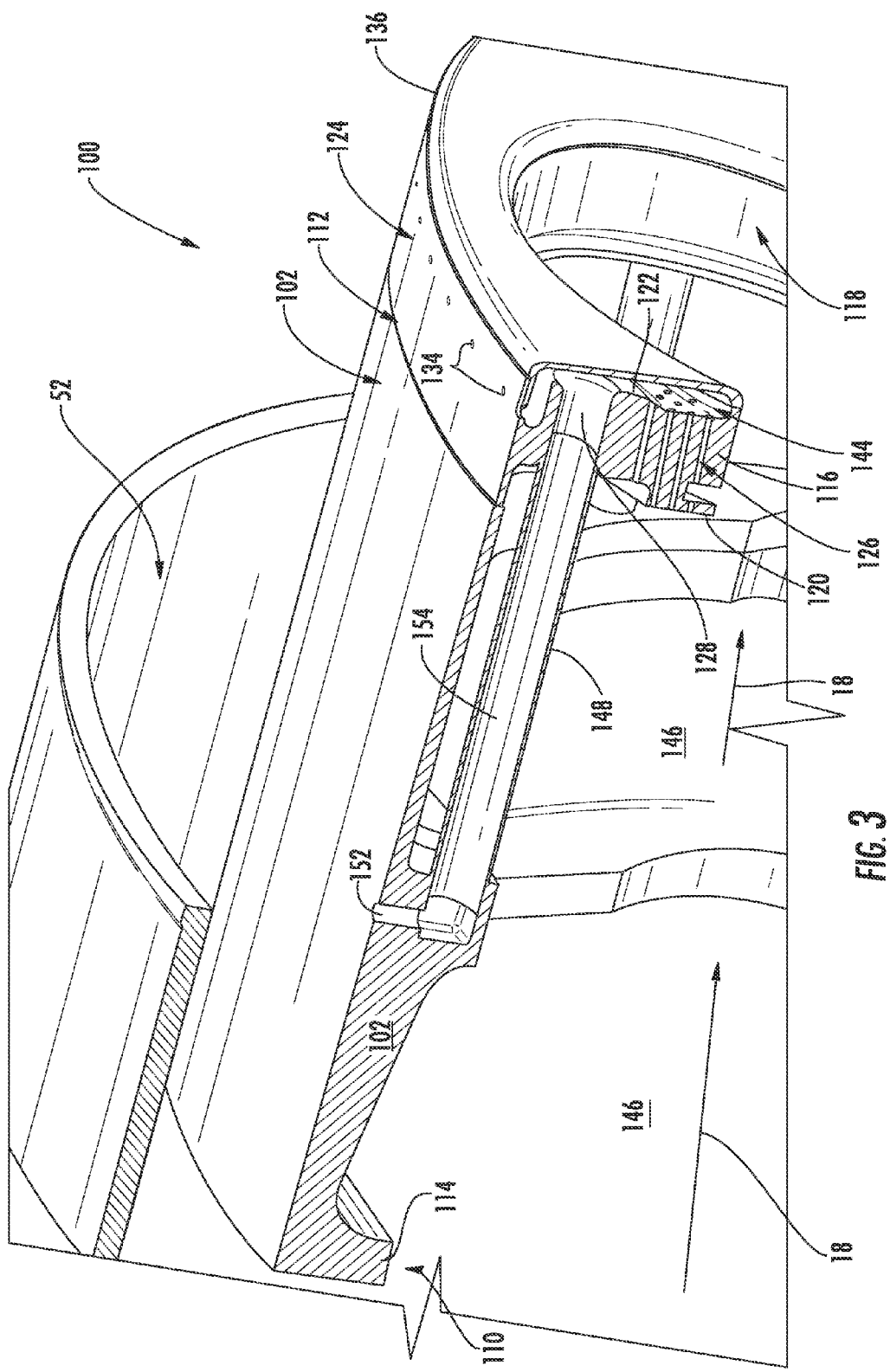
FIG. 3 is a cross sectional perspective view of a portion of a combustor cap assembly, according to one or more embodiments of the present invention.
Figure 4:
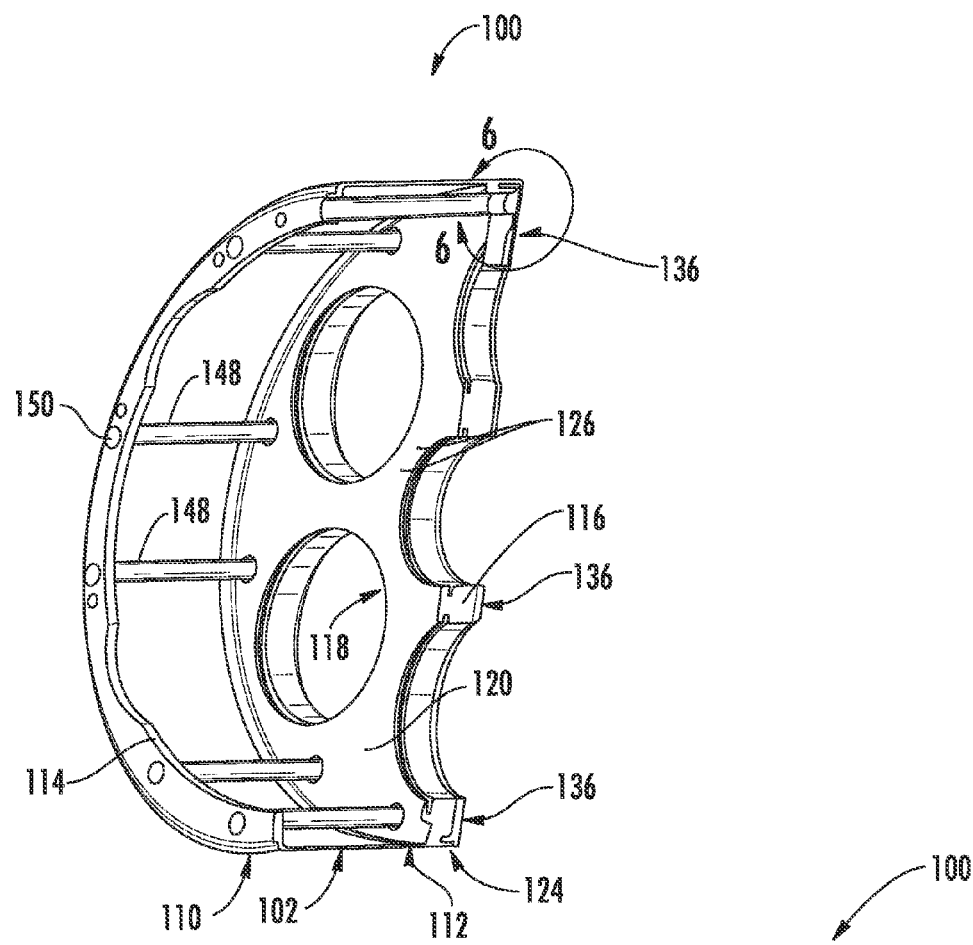
FIG. 4 is a perspective aft or back view of a portion of the combustor cap assembly as shown in FIG. 3, according to one or more embodiments of the present invention.
Figure 5:
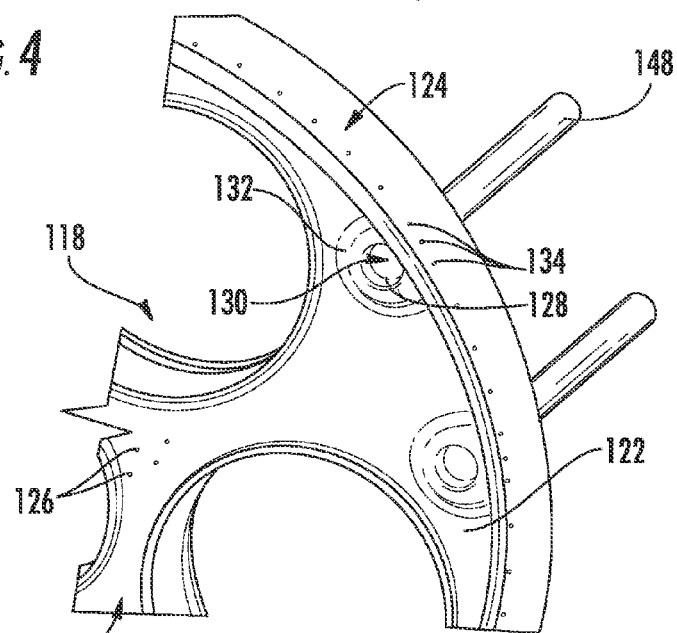
FIG. 5 is a front perspective view of a portion of the combustor cap assembly as shown in FIG. 3, according to one embodiment of the present invention.

FIG. 3 provides a cross sectional perspective view of a portion of the combustor cap assembly 100 as shown in FIG. 2, according to one or more embodiments of the present invention. FIG. 4 provides a perspective aft or back view of a portion of the combustor cap assembly 100 as shown in FIGS. 2 and 3, according to one or more embodiments. FIG. 5 provides a front perspective view of a portion of the combustor cap assembly 100 as shown in FIG. 3, according to one embodiment of the present invention. As shown in FIGS. 3 and 4, the shroud 102 includes a first end portion 110 which is axially separated from a second end portion 112. In one embodiment, as shown in FIGS. 3 and 4, a flange 114 extends radially inwardly from the shroud 102 towards an axial centerline of the shroud 102. The flange 114 may be disposed proximate to the first end portion 110. The flange 114 may be used to couple or connect the first and second shrouds 104, 106 together.

As shown in FIGS. 3, 4 and 5, the combustor cap assembly 100 further includes an impingement plate 116. In one embodiment, as shown in FIG. 3, the impingement plate 116 is coupled to the shroud 102 proximate to the second end portion 112. The impingement plate 116 extends radially and circumferentially at least partially across the second end portion 112 of the shroud 102. The impingement plate 116 may at least partially define at least one fuel nozzle passage 118 which extends axially therethrough for receiving the fuel nozzle 46 (FIG. 2).

As shown in FIGS. 3 and 4, the impingement plate 116 includes a first or upstream side portion 120. As shown in FIGS. 3 and 5, the impingement plate 116 includes a second or downstream side portion 122 and as shown in FIGS. 3, 4 and 5, the impingement plate 116 includes an outer band portion 124. The outer band portion 124 at least partially defines a radially outer perimeter of the impingement plate 116. In various embodiments, as shown in FIG. 3, the impingement plate 116 at least partially defines a plurality of impingement cooling holes 126. The impingement cooling holes 126 extend through the first side portion 120 and the second side portion 122 so as to provide for fluid communication through the impingement plate 116.

As shown in FIG. 3, the impingement plate 116 further defines at least one cooling flow return passage 128. In one embodiment, the cooling flow return passage 128 extends substantially axially through the impingement plate 116. As illustrated, the cooling flow return passage 128 extends through the first side portion 120 and the second side portion 122 so as to provide for fluid communication through the impingement plate 116. As shown in FIG. 5, an inlet 130 to the cooling flow return passage 128 is defined along the second side portion 122 of the impingement plate 116. In one embodiment, a raised portion 132 of the second side portion 122 surrounds the inlet 130. The raised portion 132 is raised axially outwardly with respect to the remainder of the second side portion 122.

In one embodiment, as shown in FIGS. 3 and 5, the outer band portion 124 at least partially defines a plurality of cooling passages 134 which extend substantially radially through the outer band portion 124 of the impingement plate 116. In one embodiment, as shown in FIG. 5, a greater number of the cooling passages 134 may be formed or concentrated proximate to the inlet 130 of the cooling flow return passage 128 than along areas of the outer band portion 124 which are not as close to the cooling flow return passage 128.

Figure 6:
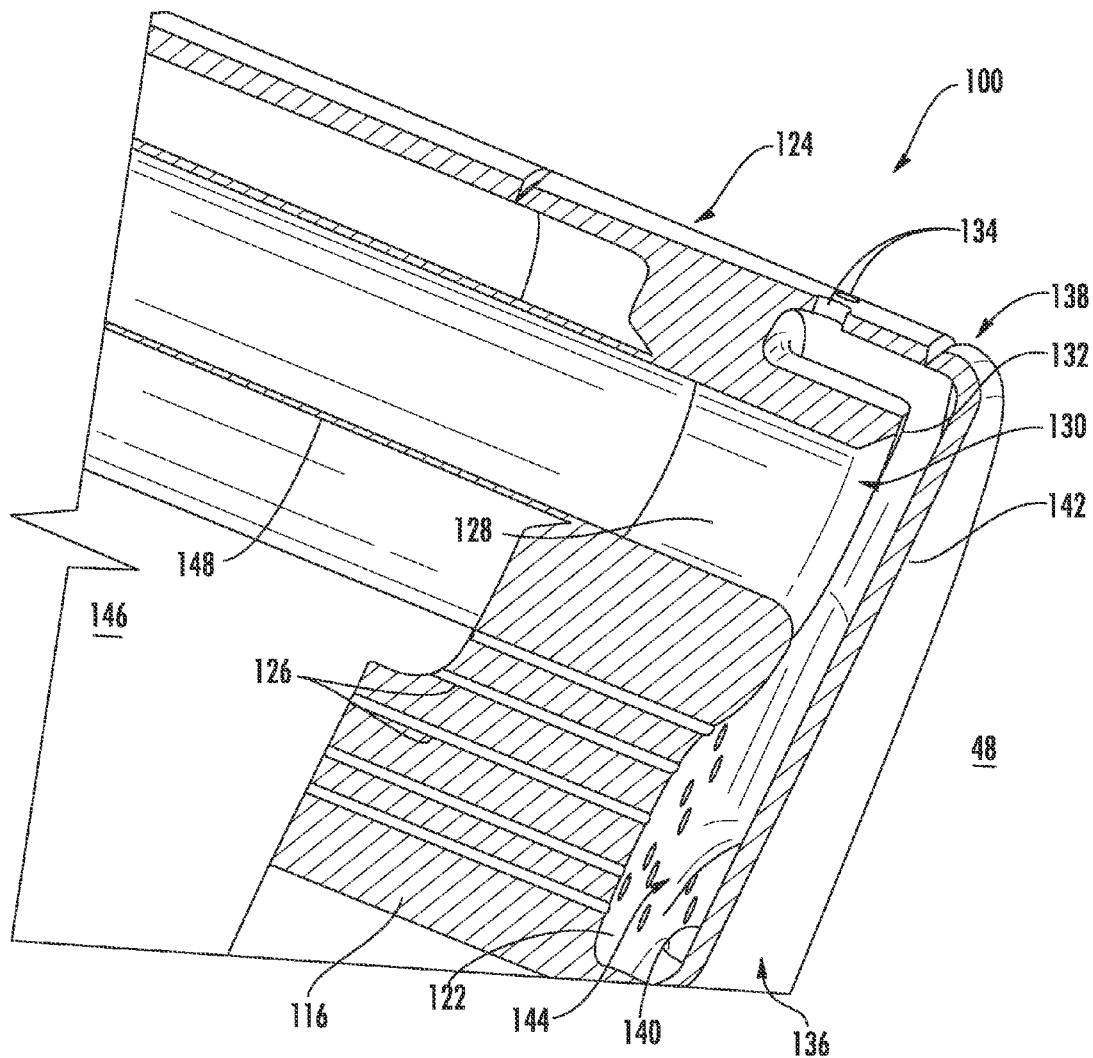
FIG. 6 is an enlarged perspective view of a portion of the combustor cap assembly as shown in FIG. 4, according to one embodiment of the present invention.

As shown in FIGS. 3 and 4, the combustor cap assembly 100 further includes a cap plate 136 coupled to the impingement plate 116. FIG. 6 provides an enlarged perspective view of a portion of the combustor cap assembly 100 as shown in FIG. 4, according to one embodiment of the present invention. In one embodiment, as shown in FIG. 6, an outer perimeter 138 of the cap plate 136 is coupled or connected to the outer band portion 124 of the impingement plate 116. As shown in FIG. 6, the cap plate 136 includes an impingement side 140 which faces the second side portion 122 of the impingement plate 116. An opposite or hot side 142 of the cap plate 136 faces towards the combustion zone or chamber 48.

The impingement side 140 is axially spaced from the second side portion to define an impingement air plenum 144 therebetween. The impingement cooling holes 126 provide for fluid communication into the impingement air plenum 144 and the cooling flow return passage 128 provides for fluid communication out of the impingement air plenum 144. In one embodiment, the cooling passages 134 also provide for fluid communication out of the impingement air plenum 144. In one embodiment, as shown in FIG. 3, the cap plate 136 further defines the fuel nozzle passage 118.

In one embodiment, as shown in FIG. 4, the shroud 102, and the impingement plate 116, particularly the first side portion 120, at least partially define a cooling air plenum 146 within the combustor cap assembly 100. As shown in FIGS. 3 and 6, the plurality of impingement cooling holes 126 provide for fluid communication between the cooling air plenum 146 and the impingement air plenum 144. The cooling air plenum 146 may at least partially surround a portion of the fuel nozzle 46 (FIG. 1).

In various embodiments, as shown in FIG. 3, the combustor cap assembly 100 further includes at least one fluid conduit 148 which is in fluid communication with the cooling flow return passage 128. In one embodiment, the fluid conduit 148 is coaxially aligned with the cooling flow return passage 128. The fluid conduit 148 extends substantially axially from the first side portion 120 of the impingement plate 116 towards the first end portion 110 of the shroud 102.

In one embodiment, as shown in FIG. 4, an outlet end 150 of the fluid conduit 148 extends at least partially through the flange 114. In one embodiment, as shown in FIG. 3, the outlet end 150 of the fluid conduit 148 is in fluid communication with a cooling air exhaust port 152. The cooling air exhaust port 152 provides for fluid communication between the impingement air plenum 144 and the annular flow passage 52. As shown in FIG. 3, the fluid conduit 148 defines a cooling flow exhaust passage 154 within the cooling air plenum 146 which is fluidly isolated from the cooling air plenum 146.

Figure 7:
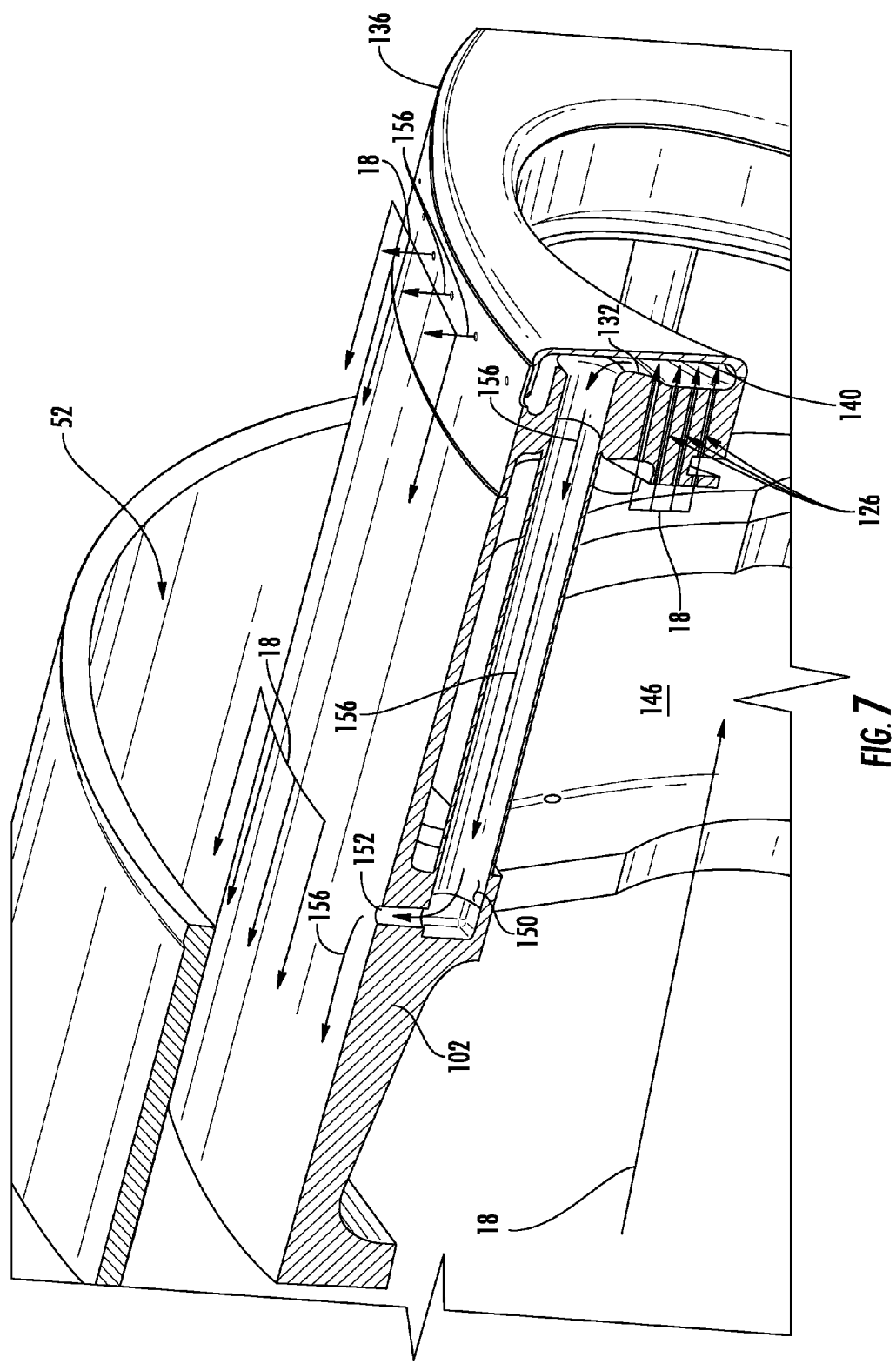
FIG. 7 is a perspective view of a portion of the cap assembly as shown in FIG. 3 in operation, according to one or more embodiments of the present invention.

FIG. 7 provides perspective view of a portion of the cap assembly as shown and described in FIGS. 2 through 6 in operation, according to one or more embodiments of the present invention. As shown in FIG. 2, the compressed air 18 flows from the high pressure plenum 44 along the annular flow passage 52 towards the end cover 42 where it reverses flow direction. A portion of the compressed air 18 flows through the fuel nozzles where it is premixed with fuel upstream from the combustion chamber 48 prior to ignition. A portion of the compressed air 18 is routed into the combustor cap assembly 100 and into the cooling air plenum 146 (FIG. 7) where it may be used to provide cooling to the fuel nozzle 46 (FIG. 2).

Referring now to FIG. 7, the compressed air 18 flows from the cooling air plenum 146 through the impingement cooling holes 126 and impinges on the impingement side 140 of the cap plate 136. As a result, thermal energy is transferred from the cap plate 136 to the compressed air 18, thus providing convective and/or impingement jet cooling to the cap plate 136. Heated compressed air 156 is then routed out of the impingement air plenum 144 and into the fluid conduit 148 via the cooling flow return passage 128. In one embodiment, the raised portion 132 of the second side portion 122 of the impingement plate 116 surrounding the inlet 130 reduces localized hot spots which may form on the cap plate 136 by reducing an axial gap between the second side portion 122 of the impingement plate 116 and the impingement side 140 of the cap plate 136, thus increasing flow velocity of the heated compressed air 156.

The heated compressed air 156 is then directed towards the outlet end 150 of the fluid conduit 148 and out of the fluid conduit 148 via the exhaust port 152. The heated compressed air 156 is then reintroduced back into the annular flow passage 52 where it mixes with compressed air 18 from the high pressure plenum 44 (FIG. 2). The reintroduction of the heated compressed 156 air back into the flow of the compressed air 18 flowing from the high pressure plenum provides additional air for the fuel nozzle fuel/air reaction. This additional air reduces engine emissions, particularly NOx emissions.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed is:

1. A combustor cap assembly, comprising:
    an annular shroud having a first end portion and a second end portion;
    an impingement plate coupled to the annular shroud proximate to the second end portion, the impingement plate including a first side portion, a second side portion and an outer band portion, the impingement plate at least partially defining a plurality of impingement cooling holes and a cooling flow return passage;
    a cap plate coupled to the impingement plate, the cap plate having an impingement side which faces the second side portion of the impingement plate, the impingement side being axially spaced from the second side portion to define an impingement air plenum therebetween, wherein the cooling flow return passage is in fluid communication with the impingement air plenum; and
    a fluid conduit in fluid communication with and coupled to the cooling flow return passage, wherein the fluid conduit extends from the first side portion of the impingement plate towards the first end portion of the annular shroud;
    wherein the combustor cap assembly is mounted in a head end of a combustor and configured to receive a flow of air supplied to the head end of the combustor, direct a first portion of the received flow of air through the plurality of impingement cooling holes into the impingement air plenum in a first direction, and direct at least some of the first portion of the received flow of air from the impingement air plenum into the fluid conduit in a second direction substantially opposite the first direction.

2. The combustor cap assembly as in claim 1, wherein an outlet end of the fluid conduit is in fluid communication with a cooling air exhaust port.

3. The combustor cap assembly as in claim 1, wherein an inlet to the cooling flow return passage is defined along the second side portion of the impingement plate, wherein a portion of the second side portion surrounding the inlet is raised towards the impingement side of the cap plate.

4. The combustor cap assembly as in claim 1, further comprising a plurality of cooling passages extending radially through the outer band portion of the impingement plate proximate to an inlet to the cooling flow return passage, wherein the plurality of cooling passages provide for fluid communication out of the impingement air plenum.

5. The combustor cap assembly as in claim 1, wherein the impingement plate and the cap plate at least partially define a fuel nozzle passage which extends axially therethrough.

6. The combustor cap assembly as in claim 1, further comprising a flange which extends radially inwardly from the annular shroud, wherein the fluid conduit extends at least partially through the flange.

7. The combustor cap assembly as in claim 1, wherein the annular shroud and the first side portion of the impingement plate at least partially define a cooling air plenum, wherein the plurality of impingement cooling holes provide for fluid communication between the cooling air plenum and the impingement air plenum.

8. The combustor cap assembly as in claim 7, wherein the fluid conduit defines a cooling flow exhaust passage within the cooling air plenum which is fluidly isolated from the cooling air plenum.

9. A combustor, comprising:
    a fuel nozzle extending axially within an outer casing; and
    a combustor cap assembly including an annular shroud circumferentially surrounding at least a portion of the fuel nozzle, wherein the annular shroud at least partially defines an annular flow passage within the outer casing, the combustor cap assembly further comprising:
    an impingement plate coupled to a second end portion of the annular shroud, the impingement plate including a first side portion, a second side portion and an outer band portion, the impingement plate at least partially defining a plurality of impingement cooling holes and a cooling flow return passage, the annular shroud and the first side portion of the impingement plate at least partially defining a cooling air plenum in fluid communication with the annular flow passage;

a cap plate coupled to the impingement plate, the cap plate having an impingement side which faces the second side portion of the impingement plate, the impingement side being axially spaced from the second side portion to define an impingement air plenum therebetween, the plurality of impingement cooling holes providing for fluid communication between the cooling air plenum and the impingement air plenum, the cooling flow return passage providing for fluid flow out of the impingement air plenum; and a fluid conduit in fluid communication with and coupled to the cooling flow return passage, the fluid conduit configured to receive the fluid flow out of the impingement air plenum, wherein the fluid conduit extends within the cooling air plenum and routes the received fluid flow to be exhausted into the annular flow passage.

10. The combustor as in claim 9, wherein the fluid conduit extends within the cooling air plenum from the first side portion of the impingement plate towards a first end portion of the annular shroud.

11. The combustor as in claim 9, wherein the fluid conduit defines a cooling flow exhaust passage within the cooling air plenum which is fluidly isolated from the cooling air plenum.

12. The combustor as in claim 9, wherein an inlet to the cooling flow return passage is defined along the second side portion of the impingement plate, wherein a portion of the second side portion surrounding the inlet is raised towards the impingement side of the cap plate.

13. The combustor as in claim 9, further comprising a plurality of cooling passages extending radially through the outer band portion of the impingement plate proximate to an inlet to the cooling flow return passage, wherein the plurality of cooling passages provide for fluid communication out of the impingement air plenum into the annular flow passage.

14. The combustor as in claim 9, wherein the fuel nozzle extends through a fuel nozzle passage at least partially defined by the impingement plate and the cap plate.

15. The combustor as in claim 9, further comprising a flange which extends radially inwardly from the annular shroud, wherein the fluid conduit extends at least partially through the flange.

16. A gas turbine, comprising:
a compressor section, a combustion section downstream from the compressor section and a turbine disposed downstream from the combustion section, the combustion section including a combustor at least partially surrounded by an outer casing, the combustor including a fuel nozzle which extends axially within the outer casing and a combustor cap assembly which circumferentially surrounds at least a portion of the fuel nozzle;

the combustor cap assembly comprising:
an annular shroud having a first end portion and a second end portion, wherein the annular shroud at least partially defines an annular flow passage within the outer casing;

an impingement plate coupled to the annular shroud proximate to the second end portion, the impingement plate having a first side portion axially spaced from a second side portion, the impingement plate defining a plurality of impingement cooling holes and a cooling flow return passage;

a cooling air plenum at least partially defined by the annular shroud and the first side portion of the impingement plate;

a cap plate coupled to the impingement plate;

an impingement plenum defined between the second side portion of the impingement plate and an impingement side of the cap plate, wherein the plurality of impingement cooling holes provide for fluid flow into the impingement plenum in a first direction and the cooling flow return passage provides for fluid flow out of the impingement plenum; and a fluid conduit in fluid communication with and coupled to the cooling flow return passage, the fluid conduit configured to receive the fluid flow out of the impingement air plenum and direct the received fluid flow in a second direction substantially opposite the first direction, the fluid conduit defining a cooling flow exhaust passage within the cooling air plenum, the cooling flow exhaust passage being fluidly isolated from the cooling air plenum.

17. The gas turbine as in claim 16, wherein an outlet end of the fluid conduit is in fluid communication with a cooling air exhaust port, the cooling air exhaust port defining a flow path into the annular flow passage.

18. The gas turbine as in claim 16, wherein an inlet to the cooling flow return passage is defined along the second side portion of the impingement plate, wherein a portion of the second side portion surrounding the inlet is raised towards the impingement side of the cap plate.

19. The gas turbine as in claim 16, further comprising a plurality of cooling passages extending radially through an outer band portion of the impingement plate proximate to an inlet to the cooling flow return passage, wherein the plurality of cooling passages provide for fluid communication out of the impingement plenum.

20. The gas turbine as in claim 16, further comprising a flange which extends radially inwardly from the annular shroud, wherein the fluid conduit extends at least partially through the flange.

* * * * *